US007979264B2

(12) United States Patent
Khan et al.

(10) Patent No.: US 7,979,264 B2
(45) Date of Patent: Jul. 12, 2011

(54) SYSTEM AND METHOD FOR INTERFACING A MEDIA PROCESSING APPARATUS WITH A COMPUTER

(75) Inventors: Mohammad Ayub Khan, Santa Clara, CA (US); Muhammad Israr Khan, Islamabad (PK); Sved Muhammad Ziauddin, Islamabad (PK); Haroon-ur-Rashid, Islamabad (PK)

(73) Assignee: Streaming Networks (Pvt) Ltd, Islamabad (PK)

( * ) Notice: Subject to any disclaimer, the term of this patent is extended or adjusted under 35 U.S.C. 154(b) by 585 days.

(21) Appl. No.: 12/037,834

(22) Filed: Feb. 26, 2008

(65) Prior Publication Data

US 2009/0216520 A1    Aug. 27, 2009

(51) Int. Cl.
G06F 9/455   (2006.01)
G06F 13/12   (2006.01)

(52) U.S. Cl. ............ 703/24; 703/13; 703/21; 703/23; 703/26; 725/118; 725/131; 725/134; 725/135; 710/8; 710/14; 710/62; 710/72; 710/74

(58) Field of Classification Search ........... 703/24
See application file for complete search history.

(56) References Cited

U.S. PATENT DOCUMENTS

| | | | | |
|---|---|---|---|---|
| 6,141,249 A * | 10/2000 | Estakhri et al. | ........... | 365/185.11 |
| 6,148,354 A * | 11/2000 | Ban et al. | ........... | 710/301 |
| 6,704,824 B1 * | 3/2004 | Goodman | ........... | 710/300 |
| 2003/0086023 A1 * | 5/2003 | Chung et al. | ........... | 348/714 |
| 2004/0049797 A1 * | 3/2004 | Salmonsen | ........... | 725/132 |
| 2004/0098596 A1 * | 5/2004 | Elteto et al. | ........... | 713/185 |
| 2004/0230710 A1 * | 11/2004 | Goodman | ........... | 710/8 |
| 2004/0258390 A1 * | 12/2004 | Olson | ........... | 386/46 |
| 2005/0235336 A1 * | 10/2005 | Ma | ........... | 725/134 |
| 2005/0246778 A1 * | 11/2005 | Usov et al. | ........... | 726/28 |
| 2006/0167886 A1 * | 7/2006 | Kantesaria et al. | ........... | 707/10 |
| 2006/0212922 A1 * | 9/2006 | Laksono | ........... | 725/151 |
| 2007/0245408 A1 * | 10/2007 | Holovacs et al. | ........... | 726/5 |
| 2008/0127225 A1 * | 5/2008 | Mullis et al. | ........... | 719/321 |
| 2008/0127328 A1 * | 5/2008 | Estevez et al. | ........... | 726/17 |
| 2009/0037648 A1 * | 2/2009 | Park et al. | ........... | 711/103 |
| 2009/0210546 A1 * | 8/2009 | Gindentuller et al. | ........ | 709/230 |

OTHER PUBLICATIONS

'Universal Serial Bus Specification' Revision 2.0, Apr. 27, 2000, pp. i,ii, and 19-20.*

* cited by examiner

*Primary Examiner* — Henry W. H. Tsai
*Assistant Examiner* — Steven G Snyder
(74) *Attorney, Agent, or Firm* — Firasat Ali; Creso Legal

(57) ABSTRACT

A system comprising a media processing apparatus and a computer where the media processing apparatus emulates a mass storage device and interfaces with the computer is disclosed. In one embodiment the media processing apparatus appears to the computer as a Universal serial bus (USB) mass storage device, and the operating system (OS) on the computer, using its pre-installed USB mass storage device driver, establishes bi-directional communication channel with the media processing apparatus. Thus, the need to develop an OS specific kernel-mode device driver for the media processing apparatus is eliminated. The system may employ a proprietary communication protocol on the USB bus to send and receive data between the computer and the media processing apparatus. In one embodiment, the computer sends and receives data by executing read and write operations to sectors of the emulated USB mass storage device; while the media processing apparatus deciphers the read and write operations on emulated sectors and takes appropriate actions. User-mode applications on the computer and the media processing apparatus may employ Remote Procedure Call (RPC) mechanisms to issue commands and share their respective resources with each other.

24 Claims, 4 Drawing Sheets

SYSTEM AND METHOD FOR INTERFACING A MEDIA PROCESSING APPARATUS WITH A COMPUTER

FIELD OF INVENTION

The present invention generally relates to media processing products (e.g., media recorders/players) and more specifically to simple and efficient methods for communication and resource sharing between a media processing apparatus and a computer over a wired or wireless communication protocol supporting mass storage device such as Universal Serial Bus (USB), IEEE 1394 bus, or any other wired or wireless communication protocol supporting mass storage devices.

BACKGROUND

The market for media processing products (e.g., audio/video recorders/players) has grown exponentially during the past decade. High quality entertainment and robust security are key product requirements of present day consumers. These requirements necessitate enhanced audio, video, and image processing capabilities in media processing products. With the advancement in technology, the transmission bandwidths and storage capacities in consumer products have increased significantly. However, they are not keeping pace with the rapid rise in the demand for rich, high-quality media content.

To enable the present day networks and storage devices to efficiently handle the increased volume of media content, an upsurge has been witnessed in the efforts to develop better compression technologies for audio, video, and image data. Consequently, many efficient audio, video, and image compression standards have evolved. Notable among them are advanced audio coding (AAC) for audio; advanced video coding (H.264/AVC) and VC-1 for video; and JPEG2000 for images. Compared with their predecessors, the new generation compression engines have improved the coding efficiency of media content by introducing more efficient tools. Increased compression, however, comes at the cost of increased computational complexity. Because of the sheer amount of data involved, the issue of computational complexity becomes more significant in the case of video processing.

Interoperability among different multi-media product brands is another major concern. This task mandates efficient inter-conversion (transcoding) between different media formats. A common use-case in this domain is the conversion of the existing compressed media contents to formats that are compliant with a variety of portable media players. Transcoding media content is a highly computation-intensive job. Video analytics is another area that is being actively pursued in the security and surveillance products. This technology requires object level identification and detection of security hazards in public places, offices and homes, and needs high computational resources. High computational requirements of all types of media processing algorithms form a major bottleneck in the deployment of multi-media products.

General purpose computers are by and large not suitable for efficient media processing. To cope with the computationally intensive nature of media applications, media processing devices based on DSPs, media processors, and other hardware solutions that are specially tailored for audio, video, and image processing have emerged. On the other hand, the abundance of storage space and the ease of connectivity in general purpose computers make them ideally suited for archiving, streaming and sharing of media content. Hence, from a resource sharing perspective, the development of efficient and robust methods for interfacing a media processing apparatus with a general purpose computer is important.

The Universal Serial Bus (USB) has become a standard communication channel to connect external devices with computer systems. The USB standard(s) defines various classes for commonly used devices. These include "Mass storage", "Human interface", "Video", "Audio", "Printer", etc. Operating systems (OS) on computers that support the USB interface provide pre-installed device drivers for using these common classes. Vendors whose USB-based products fall outside the category of common classes are required to provide OS Kernel-level device drivers to enable access to their products. This is a difficult proposition as it requires investment in time and resources to develop and test the complex Kernel-level device drivers. Moreover, this exercise has to be repeated for every operating system that a product is expected to interact with. Alternatively, a media apparatus may emulate a common class device and thereby use an OS-supplied device driver. This strategy may have huge benefits for media processing devices provided their high data rate and strict real-time data transfer constraints are satisfied.

Out of the above common device classes, the "Mass storage" class handles data to and from a computer system in the form of files. This class provides a secure way of transferring data across the USB via a file system, and is supported by all the popular computer operating systems. By emulating a "Mass storage" device a media processing apparatus may be able to use the OS-supplied "Mass storage" class device driver for data transfer. The need to develop an OS specific kernel-mode device driver for the media processing apparatus is thereby eliminated. However, transferring real-time media data through files may have its own pitfalls. Here, the involvement of a computer file system, caching and buffering of data may cause the stringent real-time constraints of media processing to be violated.

Hence, a system and a method are needed that utilize the pre-installed kernel-mode mass storage device driver, and also eliminate the overheads due to file systems. In this regard, one option is to bypass the file level abstraction provided by file systems, and instead employ an efficient and secure proprietary communication protocol to send and receive media data on the USB by directly reading/writing the emulated disk sectors.

SUMMARY

A system to facilitate data communication between a computer and a media processing apparatus is disclosed. In one embodiment of the invention, the system consists of a general purpose computer and a media processing apparatus where the media processing apparatus interfaces with the general purpose computer by emulating a mass storage device. In one instance, the media processing apparatus registers itself with a computer as a Universal Serial Bus (USB) mass storage device, and the operating system on the computer establishes a bidirectional communication channel with the media processing apparatus via its pre-installed USB mass storage device driver. Thus, the need to develop an operating system-specific kernel-mode device driver for the media processing apparatus is eliminated.

In one embodiment, the media processing apparatus is a media recording apparatus for recording audio-visual (A/V) contents directly from an A/V input source. By way of example, the A/V contents for recording may come in the form of analog/digital signals or as digital data in a compressed or uncompressed format. The recording apparatus may receive the A/V contents from a computer connected through a USB bus, or from a different transmission and/or storage source. Depending upon the nature of the input, the recording apparatus digitizes, encodes and/or transcodes the A/V contents and sends the processed A/V contents to the connected computer via the USB bus; or sends the contents to a different storage device or portable media player memory. The recording apparatus may also transmit or stream the processed A/V contents to a remote computer or a storage device via appropriate means.

The recoding apparatus may register itself with the computer operating system as a USB based mass storage device such as flash drive or a disk drive. In one embodiment, on detecting a USB disk drive, the user mode computer application software initiates a verification process and initializes a proprietary polling-based handshaking procedure. A communication protocol for transmitting and receiving data on the USB may be implemented through read and write operations on sectors of the emulated USB mass storage device. In one embodiment, the computer receives and/or sends commands and data by executing read and write operations to sectors of the emulated USB mass storage device; while the media processing apparatus deciphers the read and write operations on specific sectors and takes appropriate actions. Sectors on the emulated USB drive may be mapped to different command and data types. In one embodiment, at least one sector on the emulated USB drive is designated as a polling sector, which the computer reads (e.g., by periodically polling) to get requests from the recording apparatus, and interprets them accordingly. Other sectors may be designated to carry commands, responses and data of different types. User-mode applications on the computer and the media processing apparatus may employ Remote Procedure Call (RPC) mechanisms to issue commands and share their respective resources with one another. In this way the computer is able to share its storage, connectivity, rendering, processing and other resources, and the recording apparatus shares its A/V encoding, transcoding, capture and processing capabilities.

An embodiment of the recording apparatus may allow the connected computer to modify its configuration and change the input/output data parameters through configuration/control data sent over the USB bus. For instance, one embodiment of the recording apparatus is configured by the computer to act as an encoder and perform encoding of analog or digital input A/V signals, while another embodiment of the recording apparatus may be configured by the computer to act as a transcoder and perform transcoding of compressed A/V contents. Likewise, the encoder may be configured to receive input contents for encoding or transcoding through USB bus from the connected computer, or it may be configured to receive input contents for encoding or transcoding from another transmission or storage source. In a similar fashion, the recording apparatus may be configured to send the encoded/transcoded data back to the connected computer over the USB bus for storage, rendering or streaming, or may send the encoded/transcoded data to another external storage device, a portable media player memory, or a remote device.

Other advantages and features of the present invention will become readily apparent to those skilled in the art from the following detailed description, wherein various embodiments of the invention are shown and described by way of illustration. The invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without some of the specific details set forth herein. In some instances, well-known structures and components are shown in block diagram form, while others may be omitted completely, in order to avoid obscuring the concepts of the present invention.

Figure 1:
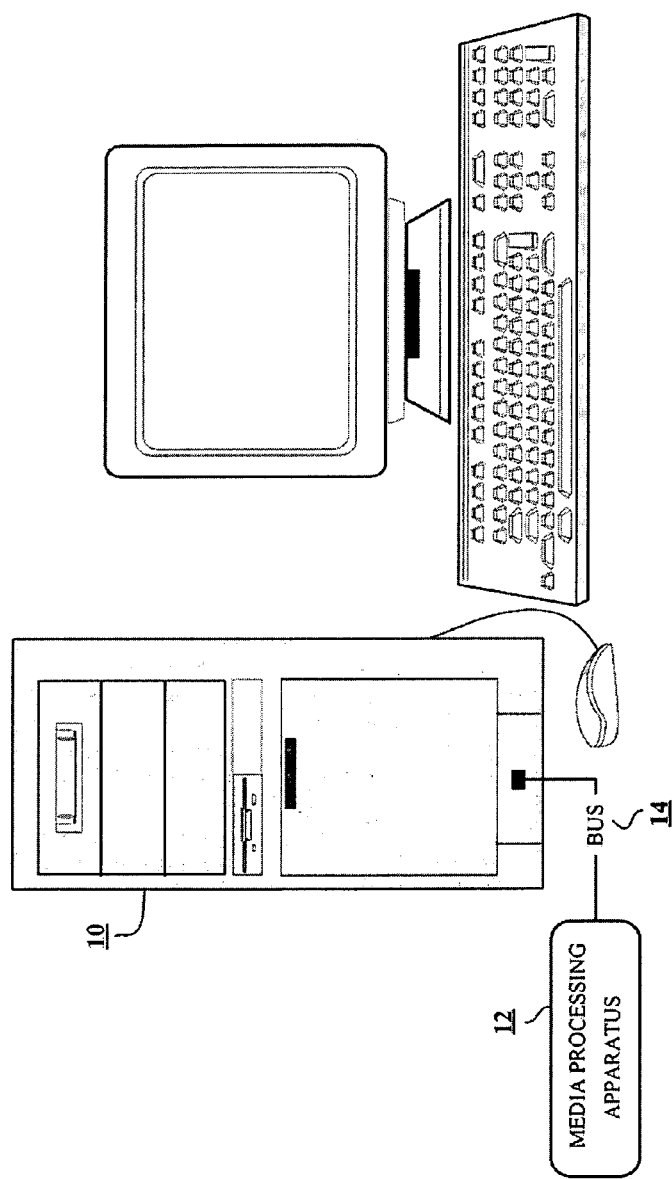
FIG. 1 illustrates an example of a system comprising a computer connected to a media processing apparatus via a bus, according to an embodiment of the invention.

FIG. 1 illustrates one embodiment of a system comprising a computer 10 and a media processing apparatus 12, where the media processing apparatus 12 is connected to the computer 10 through a communication bus 14, such as a USB bus. Although the computer 10 shown in FIG. 1 is representative of a conventional personal computer (PC), it should be noted that in an alternative embodiment, the computer 10 may be any type of computer, including a general-purpose computer, a server computer, a lap-top computer, an embedded computer, a personal digital assistant (PDA), a computer implemented on a card, a mobile phone, or any other programmable computing device. Furthermore, those skilled in the art will recognize that FIG. 1 omits many elements of a computer 10 that are not needed for the explanation of various aspects of the invention. It may also be noted that FIG. 1 shows only a single media processing device 12 connected to the computer through a USE bus 14. Other embodiments may include various types of devices connected to the computer through a plurality of communication buses including a USB bus, an IEEE 1394 bus, or any other wired or wireless communication protocol or bus. The USB bus may be coupled to the computer through means such as a bus controller or bus bridge logic, and the USB bus may be supporting any existing or future version and standard of the USB communication protocol.

In one embodiment, the media processing apparatus 12 appears to the computer 10 as a USB mass storage device, and the operating system (OS) on the computer, using its pre-installed USB mass storage device driver, establishes a bi-directional communication channel with the media processing apparatus 12. Thus, the need to develop an OS specific kernel-mode device driver for the media processing apparatus is eliminated. In one embodiment the computer operating system bypasses its file system interface, and on detecting a USB mass storage device, a user mode application program initiates a verification process and initializes a polling based data communication procedure.

Figure 2:
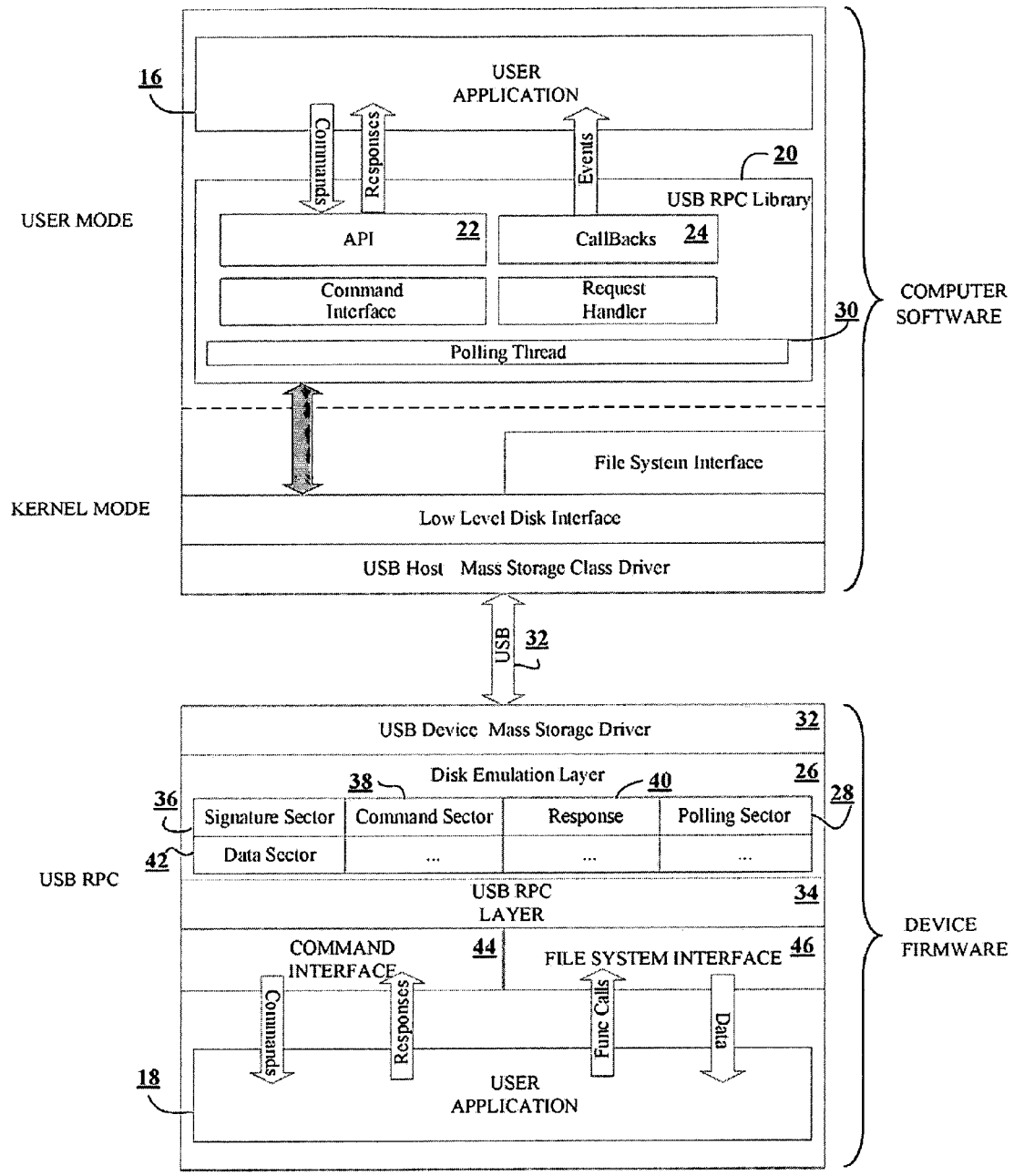
FIG. 2 depicts the logical or functional layers of a communication protocol on a USB bus to send and receive data between the computer and a media processing apparatus by emulating the media processing apparatus as a (USB) mass storage device, according to an embodiment of the invention.

FIG. 2 depicts layers of one embodiment of a polling-based communication protocol on the USB bus 14 that is used to send and receive data between the computer and a media processing apparatus, by configuring the media processing device to emulate a USB mass storage device. As illustrated in FIG. 2, a communication protocol for sending and receiving data on the USB may be implemented through read and write operations on sectors of an emulated USB mass storage device. The computer may receive and/or send commands/data by executing read and write operations to sectors of the emulated USB mass storage device; while the media processing apparatus deciphers the read and write operations on specific sectors and takes appropriate actions.

User-mode applications on the computer and the media processing apparatus (e.g., applications 16 and 18, respectively, in FIG. 2) may employ Remote Procedure Call (RPC) mechanisms to issue commands and receive responses. On the PC side, a USB RPC library 20 may provide an application programmer's interface (API) 22 to configure and control the attached media processing apparatus, and to send and receive data. The transferred data may consist of media data, for example, such as audio data, video data, or image data in compressed or uncompressed format, and may also include device configuration data, and data to control the communication process. The user mode application 16 or 18 may install Callback functions 24 with USB RPC library to help monitor important events that require the attention of the user application. Sectors on the emulated USB drive 26 may be mapped to different commands and data types. In one embodiment, at least one sector on the emulated USB drive is designated as a polling sector 28, which the computer reads periodically to get requests from the media processing apparatus, and interprets them accordingly. Other sectors may be designated to carry commands, responses and data of different types. In certain cases the computer may be required to share one or a plurality of its resources with the media processing device. For instance, in one embodiment, a connected device may require the computer to store, decode, display, or even stream the compressed media data that is transferred by the device to the computer. The USB RPC library 20 may employ separate threads to handle polling (e.g., polling thread 30) and I/O mechanisms. As shown in FIG. 2, a USB RPC library may bypass the File System layer, and directly call the low level disk interface for reading and writing to sectors of an emulated USB mass storage device. It is obvious from FIG. 2 that kernel-mode layers on the PC side are not modified and a pre-installed USB host mass storage class driver is used for establishing communication with the media processing apparatus. Moreover, the communication protocol as depicted in FIG. 2, effectively bypasses the computer's file system interface, and thereby improves the data transfer efficiency between a computer and a media processing apparatus.

On the device side, a standard USB mass storage device driver 32 is used to handle communication with the computer. Different embodiments of the media processing device hardware may or may not include a built-in or locally connected mass storage drive. To handle all types of media devices in a uniform fashion, and to facilitate data communication as a mass storage device, the device side USB RPC 34 may employ hardware and/or software means to implement a disk emulation layer 26. In one embodiment, according to a pre-defined protocol, the disk emulation layer 26 assigns emulated sectors as, for example, a signature sector 36, a command sector 38, a response sector 40, a polling sector 28, and one or a plurality of data sectors 42. On receiving read and/or write commands to these sectors, and by deciphering the data being read and/or written to these sectors, the disk emulation layer 26 generates appropriate responses and transfers the necessary data to and from the computer. The device side USB RPC 34 may provide an upper level command interface 44 for handling commands and responses, and a file system interface 46 for handling file system queries for example, such as opening, closing, reading, and writing files on the connected computer.

Figure 3:
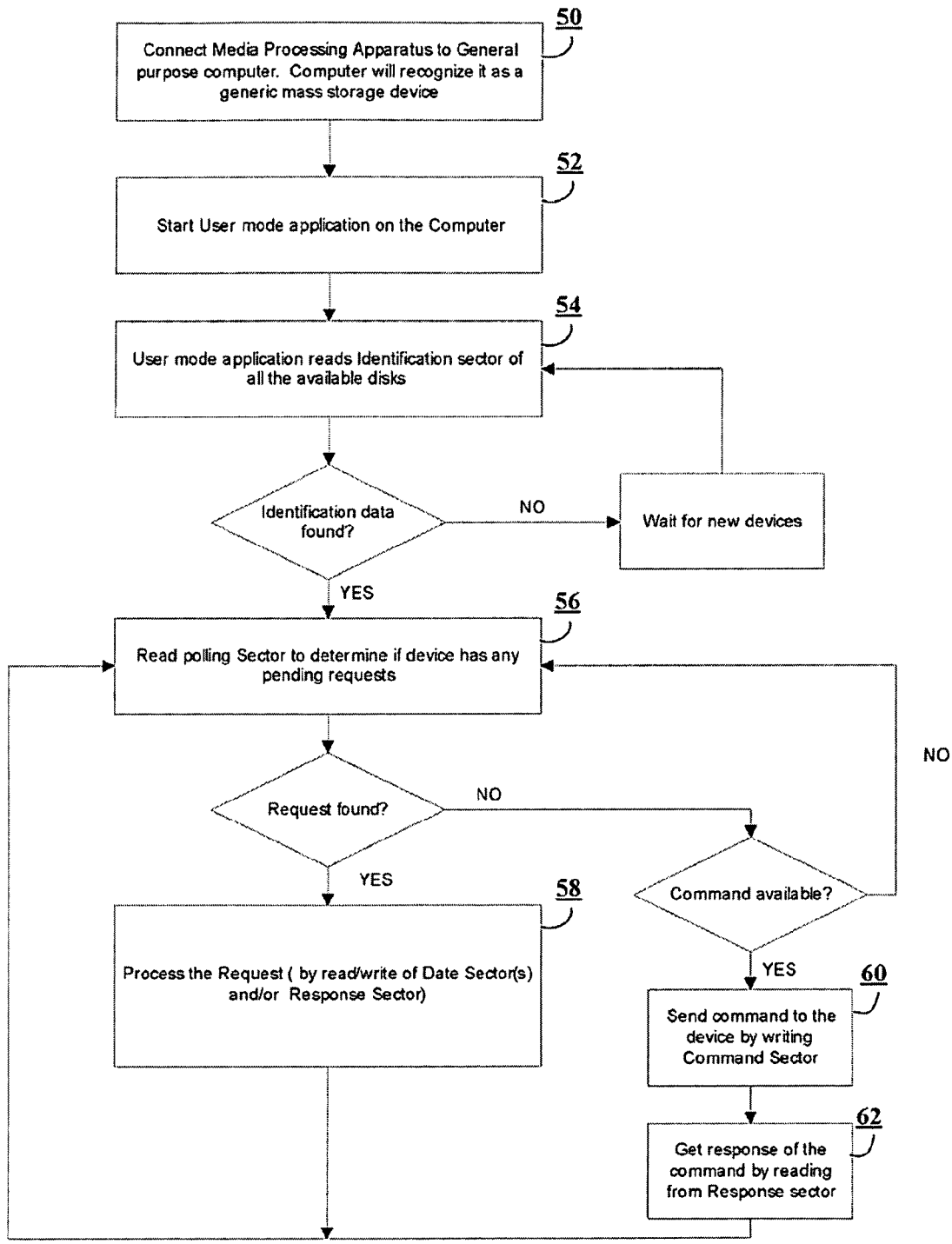
FIG. 3 is a simplified process flow diagram illustrating the procedure used to establish communication between the computer and a media processing apparatus using the proprietary communication protocol, according to an embodiment of the invention.

FIG. 3 is a simplified flow diagram depicting a session of the proprietary communication protocol between a computer and a media processing device according to one embodiment of the invention. At method operation 50, when the media processing apparatus is connected to a computer, the computer's underlying mass storage device driver registers the media processing apparatus as a generic USB mass storage class device. On initiation of the user mode application (method operation 52), the computer reads a pre-defined identification sector of all the registered mass storage devices until a device with an identification sector containing a pre-specified signature is found, as indicated in FIG. 3 by method operation 54. After the device recognition phase, at operation 56, the user mode application on the computer reads the pre-assigned polling sector in a periodic fashion to determine if the device has any pending requests. If a request is indicated by the polled data, at method operation 58 it is processed by reading and writing data to appropriate data and/or response sector(s) In the case of no pending requests from the device, the user mode application on the computer checks for any available commands. If a command to be sent to the media processing device is available, at operation 60 it may be sent by writing to pre-specified command sector(s). Additionally, at method operation 62, the user application on the computer may receive responses/data from the device by reading response and data sector(s). The simple communication protocol as depicted in FIG. 3, effectively bypasses file level abstraction, and thereby improves the data transfer efficiency between user mode application (s) on the computer and a media processing apparatus.

Figure 4:
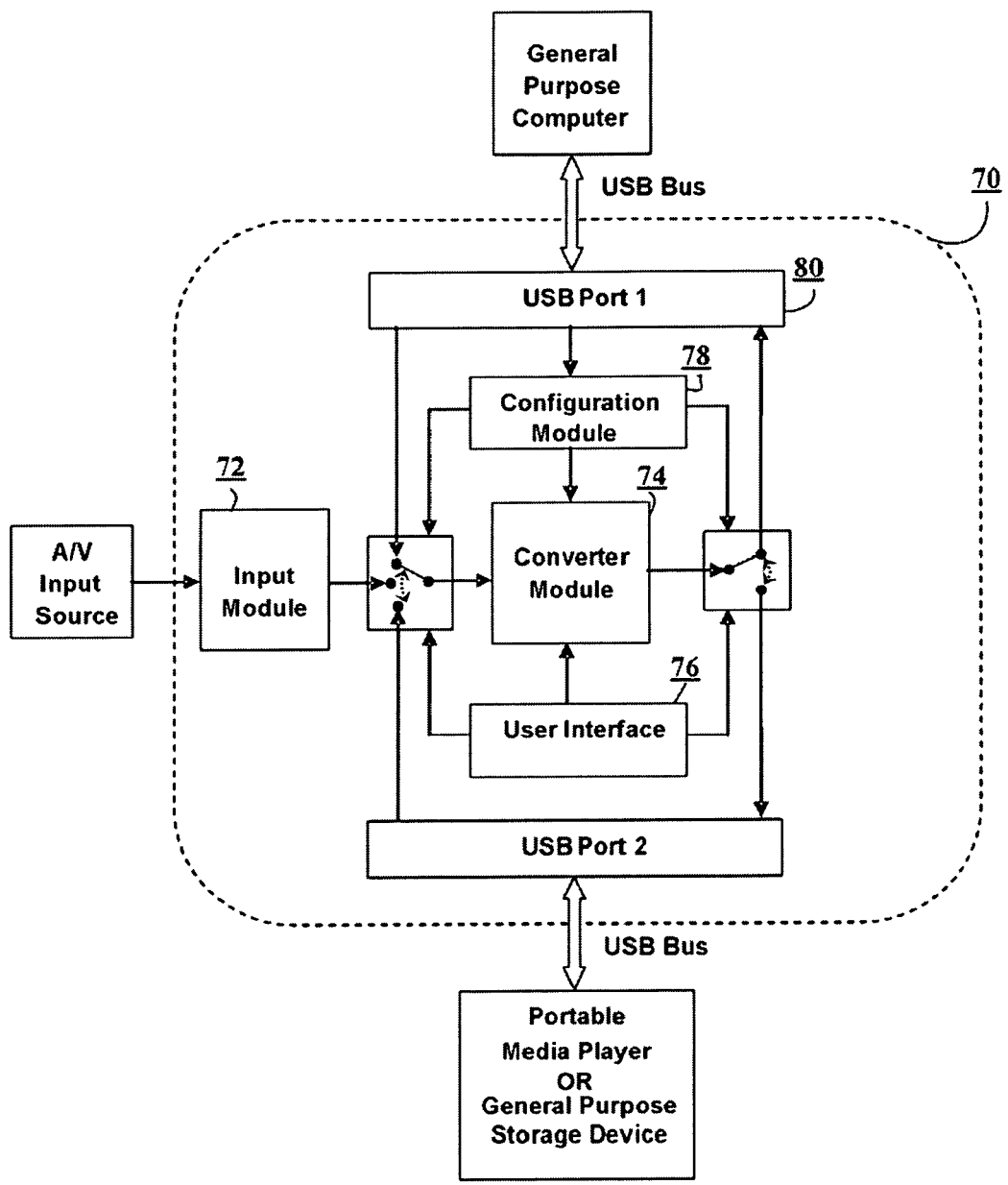
FIG. 4 is a simplified block diagram illustrating the logical or functional components of a media processing device, according to an embodiment of the invention.

FIG. 4 is a simplified diagram that shows one embodiment of the media processing apparatus 70 where the apparatus is depicted as a media recording apparatus for recording audio-visual (A/V) contents. In one embodiment as shown in FIG. 4, the recording apparatus 70 comprises an input module 72, a converter module 74, a user interface module 76, a configuration module 78, and one or more USB ports 80 for connecting to a computer and/or a portable media player or a general purpose storage device. Furthermore, the recording apparatus 70 contains means for selecting one input from a plurality of inputs and one output from a plurality of outputs. The input module 72 is configured to receive A/V contents in analog or digital form from the A/V input source. In the case of analog contents, such contents are captured by the input module 72 and suitably processed and digitized. In the case of digital contents, such contents are passed onto the converter module 74 with minimal processing. The converter module 74 may also receive compressed or uncompressed digital data from the computer or any other mass storage device via appropriate USB ports, and may receive commands and configuration data from the computer or a user input from a user interface for example, such as a keypad or a remote control. The converter module 74 along with the source input and destination output may be configured by a computer or through a user interface. For instance one embodiment of the recording apparatus 70 is configured by the computer to act as an encoder and perform encoding of analog input A/V signals, while another embodiment of the recording apparatus is configured by the computer to act as a transcoder and perform transcoding of compressed A/V contents. Likewise, the encoder may be configured to receive input contents for encoding or transcoding through USB bus from the connected computer, or it may be configured to receive input contents for encoding or transcoding from another transmission or storage source. In a similar fashion, the recording apparatus may be configured to send the encoded/transcoded data back to the connected computer over the USB bus for storage, rendering or streaming, or may send the encoded/transcoded data to another external storage device, a portable media player memory, or a remote device. Various encoding parameters including the target bit rate, target frame rate, type of rate control, frame resolution, etc. can also be configured automatically. Depending upon the nature of the input, the converter module processes the A/V input and encodes/transcodes the A/V data to a desired format. The output format of the converter module may comply with any suitable audio and/or video compression method as provided by, for example, MPEG1, MPEG2, MPEG4, H.263, H.264, VC-1, AAC, MP2, MP3, AC-3 standards, or any other standard or proprietary compression algorithm. The encoded/transcoded data is sent for storage, rendering or transmission via an appropriate USB port to the connected computer, a general purpose storage device, or a portable media player.

Although the different aspects of the invention have been explained in the context of an A/V recording device, the media processing apparatus may comprise an A/V playing apparatus, an IP camera, a camcorder, a VCR, a photo frame, a DVR, a slide show or any other media processing device. Moreover, the recording apparatus may be connected to at least one computer, where the computer could be a general purpose computer, a personal computer (PC), a lap-top computer, an embedded computer, a personal digital assistant (PDA), a computer implemented on a card, or any other programmable computing device. It is worth pointing out that the benefits of the current invention have been demonstrated with reference to a proprietary communication protocol over a USB bus by totally bypassing the computer file system. However, the benefits of the current invention are not limited to these use cases only, as a computer OS may bypass some of the aspects of its file system, or may not bypass the file system at all, thereby retaining the file level abstraction. Another aspect worth noting is that in a preferred embodiment of the current invention the media processing device is emulated as a "Mass storage" class device. However, other embodiments may emulate the media processing device as a "Video", "Audio", or any other commonly available class type, and thus reap the benefits of utilizing the already available OS specific kernel-mode device drivers. An embodiment of the invention may comprise a media processing device that may or may not contain built-in storage memory or disk for storing input and/or output A/V data. Also, the recording apparatus as described above is shown to process Audio-Visual contents, however, it should be understood that an embodiment may be perceived where the recording apparatus is used to record audio-only, video-only or still-image contents in a manner similar to that described for Audio-Visual contents. In addition to this, the communication interface between the computer and the recording apparatus has been exemplified as a USB bus, although it could be an IEEE 1394 bus, or any other wired or wireless communication protocol or a general purpose bus supporting common device classes such as mass storage devices.

What is claimed is:

1. A system comprising:
 a computer having an operating system configured to automatically detect and communicate with a common class of external devices; and
 a media processing apparatus communicatively coupled to the computer, the media processing apparatus configured to emulate a mass storage device, wherein the computer communicates with the media processing apparatus by employing (i) an operating system (OS)-supplied kernel-level common class device driver and (ii) a communication protocol in which at least one sector of the emulated mass storage device is assigned as a polling sector and the computer periodically reads the polling sector of the emulated mass storage device to receive requests from the media processing apparatus, and wherein an application on the media processing apparatus includes Universal Serial Bus (USB) mass storage device emulation logic, and according to the communication protocol, performs a write operation to an emulated signature sector for identification purposes, performs a write operation to an emulated polling sector for handshaking with the computer and sending requests, performs a read operation from an emulated command sector for receiving commands from the computer, performs a write operation to an emulated response sector for sending back its response to the computer, and performs read/write operations to an emulated data sector to transfer data to and from the computer.

2. The system of claim 1, wherein said operating system is further configured to automatically detect and communicate with a Universal Serial Bus (USB) mass storage device communicatively coupled to the computer by a USB.

3. The system of claim 1, wherein at least one bi-directional communication channel is established over a Universal Serial Bus (USB) between the computer and the media processing apparatus without using an operating system kernel-mode USB device driver that is specific to the media processing apparatus.

4. The system of claim 1, wherein the media processing apparatus further emulates a Universal Serial Bus (USB) mass storage device, and the operating system of the computer detects the media processing apparatus as a USB mass storage device.

5. The system of claim 1, wherein the emulated mass storage device is an unformatted USB mass storage device.

6. The system of claim 1, wherein a user mode application on the computer establishes at least one bi-directional communication channel over a Universal Serial Bus (USB) with the media processing apparatus that is emulating the mass storage device.

7. The system of claim 1, wherein the communication protocol uses Read and Write operations to one or more sectors of the emulated mass storage device so as to establish bi-directional communication and transfer data between the computer and the media processing apparatus.

8. The system of claim 1, wherein the communication protocol maps one or more sectors of the emulated mass storage device to specific tasks including device polling, signature identification, sending commands, receiving responses, and sending/receiving media and configuration data; and the computer along with the coupled media processing apparatus perform read and write operations to a mapped sector in order to perform a task.

9. The system of claim 1, wherein communications between the computer and the media processing apparatus are achieved via a communication protocol that supports a common class of external devices for which an OS-supplied kernel-level common class device driver exists in the computer.

10. A system comprising:
 a computer having an operating system configured to automatically detect and communicate with a common class of external devices; and
 a media processing apparatus communicatively coupled to the computer, the media processing apparatus configured to emulate a mass storage device, wherein the computer communicates with the media processing apparatus by employing (i) an operating system (OS)-supplied kernel-level common class device driver and (ii) a communication protocol in which at least one sector of the emulated mass storage device is assigned as a polling sector and the computer periodically reads the polling sector of the emulated mass storage device to receive requests from the media processing apparatus, and wherein a user-mode application on the computer contains logic configured to interact with an emulated Universal Serial Bus (USB) mass storage device, and according to the communication protocol, performs a read operation from an emulated signature sector for identification purposes, performs a read operation from an emulated polling sector for handshaking with the media processing apparatus and receiving its requests performs a write operation to an emulated command sector for sending commands to the media processing apparatus, performs a read operation from an emulated response sector for receiving a response from the media processing apparatus, and performs read/write operations to an emulated data sector to transfer data to and from the media processing apparatus.

11. The system of claim 1, wherein a polling rate of the polling sector is either fixed or adjusted dynamically.

12. The system of claim 1, wherein a user-mode application on the computer (i) bypasses some aspects or an entire functionality of a computer file system and (ii) directly accesses a low level disk interface.

13. The system of claim 1, wherein a communication channel is established between the computer and an emulated Universal Serial Bus (USB) mass storage device without using files.

14. The system of claim 1, wherein the media processing apparatus is one or more of an Audio/Video (A/V) recording apparatus, an A/V encoding apparatus, an A/V converter, an A/V transcoder, an A/V playing apparatus, an Internet Protocol (IP) camera, a camcorder, a Video Cassette Recorder (VCR), a photo frame, a slide show, a Digital Video Recorder (DVR), a telephone, a cellular phone, and a video phone.

15. The system of claim 1, wherein the media processing apparatus is automatically configured by the computer through configuration and control data sent over a general purpose bus.

16. The system of claim 1, wherein the media processing apparatus has one or more ports that interface with one or more computers, mass storage devices, portable media players and other remote devices.

17. The system of claim 1, wherein the computer and the media processing apparatus share resources and/or distribute a processing load of media processing algorithms.

18. The system of claim 1, wherein the media processing apparatus has a local memory configured to store input/output data.

19. The system of claim 1, wherein the media processing apparatus directly consumes or transfers input/output data without storing the data in memory.

20. The system of claim 1, wherein the computer receives data from the media processing apparatus and transmits it to a remote device by employing a general purpose bus or a communication network.

21. The system of claim 1, wherein data transferred between the computer and the media processing apparatus includes one or more of media data in compressed form, media data in uncompressed form, device configuration data, and data that controls a communication process.

22. The system of claim 1, wherein the media processing apparatus receives input Audio/Video (A/V) signals from an input source via a first general purpose communication bus, and sends output A/V signals over the first general purpose communication bus or a second general purpose communication bus.

23. The system of claim 1, wherein the media processing apparatus employs wired or wireless network connectivity to transfer encoded or transcoded audio/video data to a remote device.

24. The system of claim 1, wherein a user-mode application on the computer uses aspects of a computer file system.

* * * * *